(No Model.)

J. H. SEWALL.
HOSE OR PIPE COUPLING.

No. 437,518.  Patented Sept. 30, 1890.

Witnesses.
Frederick L. Emery
Fred. S. Greenleaf

Inventor.
James H. Sewall,
by Emery & Gregory
Attys.

UNITED STATES PATENT OFFICE.

JAMES H. SEWALL, OF PORTLAND, MAINE, ASSIGNOR TO THE CONSOLIDATED CAR HEATING COMPANY OF WEST VIRGINIA, OF ALBANY, NEW YORK.

HOSE OR PIPE COUPLING.

SPECIFICATION forming part of Letters Patent No. 437,518, dated September 30, 1890.

Application filed June 24, 1889. Serial No. 315,307. (No model.)

*To all whom it may concern:*

Be it known that I, JAMES H. SEWALL, of Portland, county of Cumberland, State of Maine, have invented an Improvement in Hose or Pipe Coupling, of which the following description, in connection with the accompanying drawings, is a specification, like letters on the drawings representing like parts.

This invention has for its object to produce an intermediate coupling to be used in connection with two unlike couplings, and by means of which the two unlike couplings may be so connected as to form a continuous passage from one to the other through the said intermediate coupling.

My invention consists of an intermediate coupling comprising two coupling-heads of different systems connected together and having a passage from one to the other.

Figure 1:
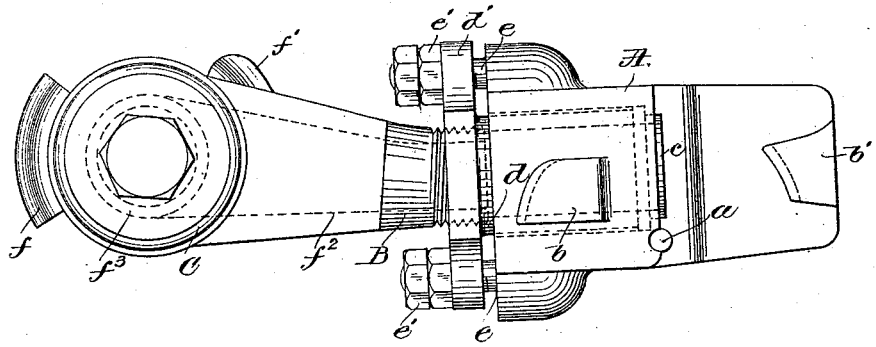
Figure 2:
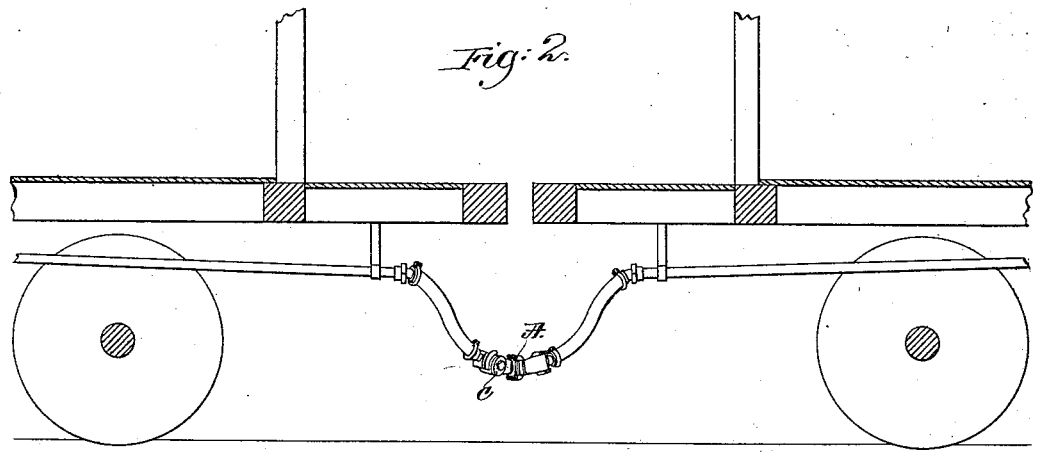

Figure 1 is a side view of an intermediate coupling embodying my invention; and Fig. 2 shows the said coupling in position, connecting two unlike couplings.

Referring to Fig. 1 of the drawings, the head or casting A is provided with a half-hinge $a$ and the radial projections $b$ $b'$, formed to co-operate with a coupling commonly known as the "Sewall" coupling. The said head A is cored out longitudinally (see dotted lines, Fig. 1) to receive the gasket $c$ to co-operate with a similar gasket upon the Sewall coupling, to form a tight joint when the two are coupled together. The gasket $c$ is held in place by the gland $d$, having a flange $d'$, through suitable holes in which pass the bolts $e$ of the head A, the said bolts receiving upon them nuts $e'$, by means of which the said gland is forced against the gasket $c$. The gland $d$ is internally screw-threaded to receive the threaded neck B of the head C, the said head being provided with suitable radial projections $f$ $f'$ to co-operate with a coupling commonly known as the "Westinghouse" coupling.

The head C and its neck B have a longitudinal passage $f^2$, (shown in dotted lines, Fig. 1,) and in the head C the said passage is provided with a gasket $f^3$ (shown in dotted lines) to co-operate with a similar gasket on the Westinghouse coupling to make a tight joint when the two are coupled together. A continuous passage is thus formed, extending from the head A to the head C of the intermediate coupling.

When it is desired to couple a car or cars equipped with the Westinghouse coupling into a train equipped with the Sewall coupling, or vice versa, by placing the intermediate coupling between the two opposing and unlike couplings and locking the head A to the Sewall coupling and the head C to the Westinghouse coupling a continuous tight passage will be formed from one to the other through the intermediate coupling.

I do not desire to limit myself to the two types of couplings shown and described, as it is obvious that any other two types may as well be employed. Neither do I desire to limit myself to the particular construction shown, as the same may be varied and still come within the scope of this invention.

I claim—

1. An intermediate hose or pipe coupling adapted to be placed between and to co-operate with two unlike couplings, one end of the said intermediate coupling being formed to co-operate with a coupling of one type and the other end of the said intermediate coupling being formed to co-operate with a coupling of a different type, substantially as described.

2. An intermediate coupling-section consisting of coupling-heads of different systems connected together through the medium of a pipe or passage, substantially as described.

In testimony whereof I have signed my name to this specification in the presence of two subscribing witnesses.

JAMES H. SEWALL.

Witnesses:
JAS. H. CHURCHILL,
FREDERICK L. EMERY.